J. S. & T. B. ATTERBURY.
Lamp.
No. 82,579.
Patented Sept. 29, 1868.
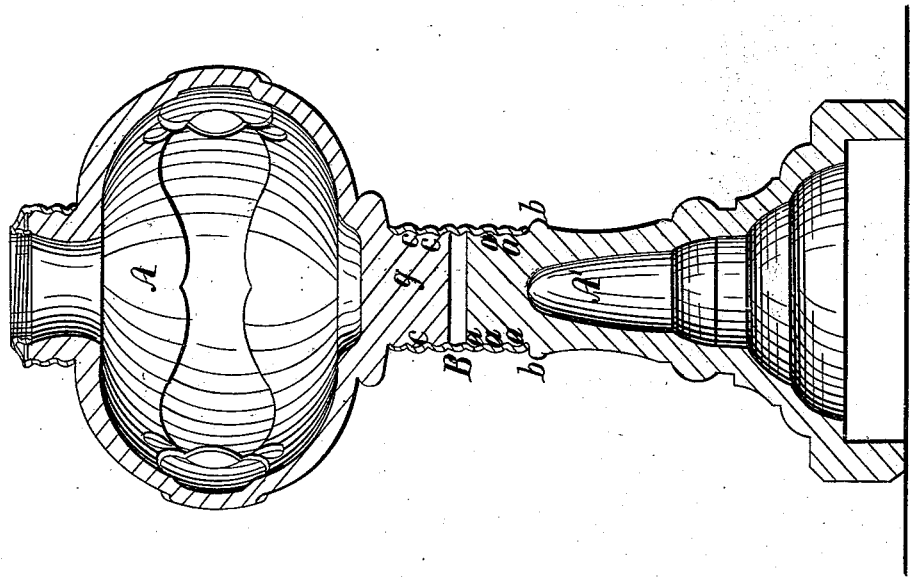
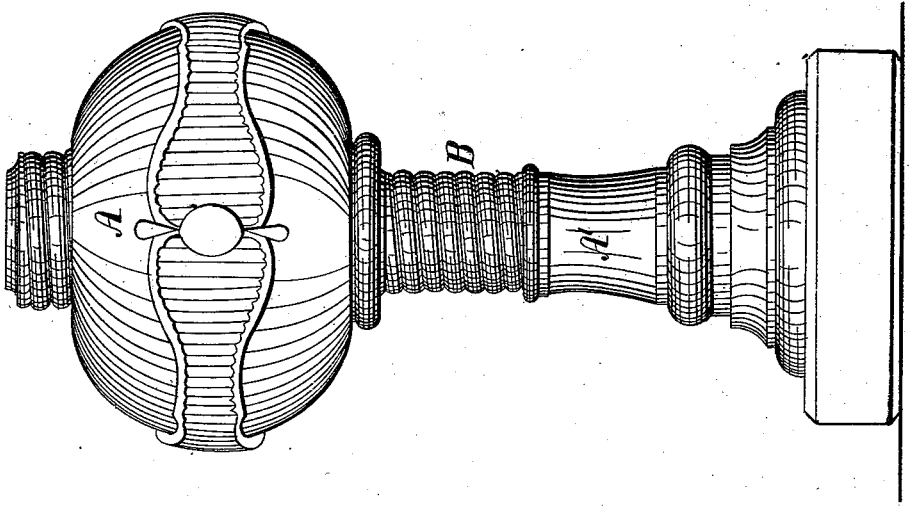
Witnesses:
R. J. Campbell
J. N. Campbell
Inventors:
J. S. Atterbury
T. B. Atterbury
by Mason Fenwick & Lawrence

UNITED STATES PATENT OFFICE.

JAMES S. ATTERBURY AND THOMAS B. ATTERBURY, OF PITTSBURG, PA.

IMPROVEMENT IN LAMPS.

Specification forming part of Letters Patent No. 82,579, dated September 29, 1868.

*To all whom it may concern:*

Be it known that we, JAMES S. ATTERBURY and THOMAS B. ATTERBURY, of Pittsburg, in the county of Allegheny and State of Pennsylvania, have invented a new and useful Improvement in Lamps; and we do hereby declare that the following is a full, clear, and exact description thereof, reference being had to the accompanying drawings, making a part of this specification, in which—

Figure 1 is a side view of a stand or pedestal-lamp having our improvement applied to it. Fig. 2 is a diametrical section through such lamp.

Similar letters of reference indicate corresponding parts in the two figures.

This invention relates to an improvement on that class of lamps having their bowls mounted upon pillars or stands, which are produced separate from and afterward secured to the bowls, and which serve as a means to elevate the bowls, and also as a means by which to grasp the lamps in moving them about.

Prior to our invention it has been the practice to secure lamp-bowls of this class of lamps to their stands by means of metallic tubes into which plaster-of-paris is introduced, which substance will lose its efficiency as cement after a time, and allow the bowls to become detached from their stands.

The object of our invention is to effect a much safer, and in all respects better, attachment of lamp-bowls to their stands or pillars, by employing screw or interlocking fastenings which are formed on the parts to be connected, as will be hereinafter explained.

To enable others skilled in the art to understand our invention, we will describe its construction and operation.

In the accompanying drawings, A represents a glass lamp-bowl or "peg," which may be made of any desirable form or design, and in the usual well-known manner, with the following exception, to wit: In constructing the mold in which the foot-piece $g$ is usually formed, it is made to present a screw-thread, so that the foot-piece, $g$, produced therein will have a corresponding screw-thread, $c$, upon its surface. The upper end or neck of the stand A' is, in like manner, constructed with a screw-thread, $a$, upon its circumference, and with a shoulder-stop, $b$, at the lower termination of such thread.

By means of the short metallic screw tube or socket, the two parts A A' are securely united together without liability of casual detachment.

The base or stand portion A' may be made of any vitreous substance, or it may be made of metal or other material.

Having described our mode of carrying out our invention, what we claim as new, and desire to secure by Letters Patent, is—

A glass lamp-bowl and a glass stand united together by means of a screw-socket piece, B, as a new and improved article of manufacture.

J. S. ATTERBURY.
T. B. ATTERBURY.

Witnesses:
JOHN C. STEVENSON,
A. B. STEVENSON.